(12) United States Patent
Hirao et al.

(10) Patent No.: US 7,851,004 B2
(45) Date of Patent: Dec. 14, 2010

(54) TASTE-IMPROVING COMPOSITION AND APPLICATION OF THE SAME

(75) Inventors: Kazutaka Hirao, Toyonaka (JP); Makiko Ichimiya, Toyonaka (JP)

(73) Assignee: San-Ei Gen F.F.I., Inc., Osaka (JP)

( * ) Notice: Subject to any disclaimer, the term of this patent is extended or adjusted under 35 U.S.C. 154(b) by 788 days.

(21) Appl. No.: 10/484,038

(22) PCT Filed: Jul. 19, 2002

(86) PCT No.: PCT/JP02/07339

§ 371 (c)(1),
(2), (4) Date: Jan. 16, 2004

(87) PCT Pub. No.: WO03/007734

PCT Pub. Date: Jan. 30, 2003

(65) Prior Publication Data

US 2004/0197453 A1    Oct. 7, 2004

(30) Foreign Application Priority Data

Jul. 19, 2001    (JP)    .............................. 2001-220503

(51) Int. Cl.
*A23L 1/236*    (2006.01)
(52) U.S. Cl. .................. 426/548; 426/534; 426/650
(58) Field of Classification Search ................ 426/534, 426/548, 650
See application file for complete search history.

(56) References Cited

U.S. PATENT DOCUMENTS

| | | |
|---|---|---|
| 4,917,913 A | 4/1990 | Buckholz |
| 4,960,603 A | 10/1990 | Buckholz |
| 4,966,783 A | 10/1990 | Buckholz |
| 4,988,527 A | 1/1991 | Buckholz |
| 4,988,532 A | 1/1991 | Buckholz |
| 4,999,207 A | 3/1991 | Buckholz |
| 5,366,747 A | 11/1994 | Buckholz |
| 5,372,834 A | 12/1994 | Buckholz |

FOREIGN PATENT DOCUMENTS

| | | |
|---|---|---|
| GB | 1248313 | 9/1971 |
| JP | 60-123483 | 7/1985 |
| JP | 2000-303091 | 10/2000 |
| JP | 2000-303091 A1 | 10/2000 |
| WO | WO 00/24273 | 5/2000 |
| WO | WO 00/62628 | 10/2000 |

OTHER PUBLICATIONS

Japanese Patent Office Gazette 11 (1999)-6, Published collection of well-known prior arts (Perfumes) Part I, Perfumes in general, Jan. 29, 1999, pp. 230, 239.

Hajime Kaneko, The Aroma of Cigar tobacco Part II. Isolation of Norambreinolide from Cigar Tobacco, Agri. Biol. Chem., vol. 35, No. 9, pp. 1461-1462 (1971).

Japanese Patent Office Gazette II (1999)-6 Collection of Universally Known and Customary Technology.(Fragrance), Part I, General Fragrances, pp. 230, Jan. 29, 1999.

*Primary Examiner*—Leslie Wong
(74) *Attorney, Agent, or Firm*—Dickstein Shapiro LLP

(57) ABSTRACT

The present invention provides a method for improving the taste of sweeteners, and a method for improving the taste of edible products containing sweeteners. The present invention can be worked by using sclareolide and 2-acetylpyrrole in combination with a sweetener. By using the method of the present invention, an astringent taste, bitter taste or aftertastes such as lingering taste originating especially in high-intensity sweeteners can be reduced, so that edible products with an improved taste can be provided.

13 Claims, No Drawings

TASTE-IMPROVING COMPOSITION AND APPLICATION OF THE SAME

This application is a 371 of PCT/JP02/07339 filed Jul. 19, 2002.

TECHNICAL FIELD

The present invention relates to a composition that improves the taste of sweeteners. More specifically, the present invention relates to a taste-improving composition that can improve the taste of sweeteners by imparting a sharp or clean sensation to the sweetener, or by suppressing the appearance of any negative taste (hereafter referred to as a "disagreeable taste") such as an astringent taste, bitter taste, lingering aftertaste or the like. Furthermore, the present invention also relates to a method for improving the taste of sweeteners. In addition, the present invention also relates to a method for improving the taste of edible products that contain sweeteners, and an edible product whose taste is thus improved.

BACKGROUND ART

Conventionally, sucrose (sugar) has been widely utilized as a sweetener in edible products such as food products, drugs and the like, since such sugar has a favorable sweetness and good body, and since this sucrose is also superior in terms of characteristics such as imparting of moisture retention, viscosity and the like. However, although sucrose has a favorable sweetness and good body, the sucrose has come to be avoided because it is a cause of obesity and tooth decay, and there is a trend toward an improved health and a reduction in caloric intake recently. Especially in the case of favorite foods such as beverages, confections and the like, there has been a progressive lowering of sugar content and caloric content. Accordingly, there has been a demand for a sweetener that has a favorable sweetness comparable to that of sucrose, and that also has a low caloric content, as a sweetener used in the manufacture of such favorite foods. Furthermore, this demand for reduced caloric content and favorable sweetness is not limited to the favorite foods, but also arises in regard to a table sweetener. Moreover, in general food products as well, there has been a desire for a light and moderate sweet taste.

In order to meet such demands of consumers, so-called "high-intensity sweeteners" have appeared as sweeteners used in place of sucrose. Since most of these sweeteners have a stronger sweetness than sucrose, these sweeteners also have the characteristics of "low-calorie sweeteners" that can impart sweetness comparable to that of sucrose when used in smaller amounts than sucrose. Examples of such high-intensity sweeteners include aspartame, potassium acesulfame, licorice extract, saccharin, sodium saccharin, sucralose, stevia extract, neotame and the like. However, there are few high-intensity sweeteners that have a favorable sweetness and body comparable to those of sucrose; most of these sweeteners have a peculiar bitter taste or astringent taste, and a lingering taste (aftertaste) in which the sweet taste tends to linger. In the past, therefore, there has been a demand for methods to ameliorate disagreeable tastes such as the abovementioned bitter taste, astringent taste or aftertaste.

Meanwhile, sclareolide ((3aR,5aS,9aS,9bR)-decahydro-3a,6,6,9a-tetramethylnaphtho[2,1-b]furan-2(1H)-one) is a natural norlabdane type terpenoid which is found (for example) in tobacco (Kaneko, H., Agr. Biol. Chem., 35 (9): 1461 (1971)). It is known that this sclareolide has a masking or enhancing action with respect to specified tastes (see U.S. Pat. No. 4,917,913, U.S. Pat. No. 4,960,603, U.S. Pat. No. 4,966,783 and U.S. Pat. No. 4,988,527). Furthermore, it is also known that sclareolide is used as a fragrance in cigarette tobacco (Japanese published un-examined patent application No. 60-123483), and as an additive for eliminating the bitter taste of coffee (U.S. Pat. No. 4,988,532). Moreover, it is also known that this substance has an effect in improving the aftertaste of aspartame (U.S. Pat. No. 4,999,207).

Meanwhile, 2-acetylpyrrole is known as a fragrance enhancing agent for tobacco (British Patent No. 1,248,313). Furthermore, in the Collection of Universally Known and Customary Technology issued by the Japanese Patent Office, this substance is cited as a fragrance that has a masking effect (Japanese Patent Office Gazette 11 (1999)-6 Collection of Universally Known and Customary Technology (Fragrances), Part 1, General Fragrances, issued Jan. 29, 1999).

However, when sclareolide is used along, the effect in improving the taste by suppressing the disagreeable taste of high-intensity sweeteners is insufficient; furthermore, in the case of 2-acetylpyrrole, no effect in suppressing the disagreeable taste of high-intensity sweeteners or improving the taste of sweeteners is known.

DISCLOSURE OF THE INVENTION

The present invention was developed in light of the abovementioned facts. It is an object of the present invention to provide a method for improving the taste of sweeteners, especially a method for improving this taste by suppressing the appearance of disagreeable tastes such as the bitter taste, astringent taste, aftertaste or the like found in high-intensity sweeteners. It is a further object of the present invention to provide a taste-improving composition which can be effectively used to suppress the appearance of disagreeable tastes in the abovementioned sweeteners, and to improve the taste of such sweeteners. It is a further object of the present invention to provide a method for improving the taste of edible products that contain sweeteners, especially a method for improving the taste of edible products containing high-intensity sweeteners by suppressing the appearance of disagreeable tastes originating in this high-intensity sweeteners. Furthermore, it is also an object of the present invention to provide edible products containing sweeteners with an improved taste obtained by the abovementioned method.

The present inventors conducted diligent research in light of the abovementioned problems encountered in the prior art. As a result, the inventors discovered that a taste with a sharp and clean sensation can be imparted to saccharide such as sucrose or like with the full-bodied sweetness by mixing sclareolide and 2-acetylpyrrole with the saccharide. The inventors further discovered that by mixing sclareolide and 2-acetylpyrrole with high-intensity sweeteners or other sweeteners, it is possible to significantly suppress the appearance of disagreeable taste such as the bitter taste, astringent taste, aftertaste or the like shown by such sweeteners, so that the taste of these sweeteners is improved.

The present invention is a composition for improving the taste of sweeteners as described in items 1 through 4 below.

Item 1. A taste-improving composition for sweeteners which contains sclareolide and 2-acetylpyrrole.

Item 2. The taste-improving composition according to item 1, wherein the sweetener is a high-intensity sweetener.

Item 3. The taste-improving composition according to item 2, wherein the high-intensity sweetener is at least one selected from aspartame, potassium acesulfame, licorice extract, saccharin, sodium saccharin, sucralose, stevia extract and neotame.

Item 4. The taste-improving composition according to any of items 1 through 3, wherein the mixture proportions of sclareolide and 2-acetylpyrrole are 0.001 to 1000 parts by weight of 2-acetylpyrrole to 1 part by weight of sclareolide.

Furthermore, the present invention is a method for improving a taste of edible products containing sweeteners as described in items 5 through 9 below.

Item 5. A method for improving a taste of edible products containing sweeteners, in which sclareolide and 2-acetylpyrrole are used in combination with a sweetener.

Item 6. The method for improving a taste of edible products according to item 5, wherein the sweetener is a high-intensity sweetener.

Item 7. The method for improving a taste of edible products according to item 6, wherein the high-intensity sweetener is at least one selected from aspartame, potassium acesulfame, licorice extract, saccharin, sodium saccharin, sucralose, stevia extract and neotame.

Item 8. The method for improving a taste of edible products according to any of items 5 through 7, wherein the mixture proportions of sclareolide and 2-acetylpyrrole are 0.001 to 1000 parts by weight of 2-acetylpyrrole to 1 part by weight of sclareolide.

Item 9. The method for improving a taste of edible products according to any of items 5 through 8, wherein the edible product is selected from table sweeteners, beverages, desserts and cold confections.

Furthermore, the present invention is an edible product containing a sweetener whose taste has been improved, as described in items 10 through 14 below.

Item 10. An edible product containing a sweetener in which the taste of the sweetener has been improved, further containing sclareolide and 2-acetylpyrrole in addition to the sweetener.

Item 11. The edible product containing a sweetener according to item 10, wherein the sweetener is a high-intensity sweetener.

Item 12. The edible product containing a sweetener according to item 11, wherein the high-intensity sweetener is at least one selected from aspartame, potassium acesulfame, licorice extract, saccharin, sodium saccharin, sucralose, stevia extract and neotame.

Item 13. The edible product containing a sweetener according to any of items 10 through 12, wherein the mixture proportions of sclareolide and 2-acetylpyrrole are 0.001 to 1000 parts by weight of 2-acetylpyrrole to 1 part by weight of sclareolide.

Item 14. The edible product containing a sweetener according to any of items 10 through 13, wherein this edible product is selected from table sweeteners, beverages, desserts and cold confections.

BEST MODE FOR CARRYING OUT THE INVENTION (1) Taste-Improving Composition

The taste-improving composition of the present invention is characterized in that this composition contains sclareolide and 2-acetylpyrrole as essential ingredients.

Sclareolide ((3aR,5aS,9aS,9bR)-decahydro-3a,6,6,9a-tetramethylnaphth[2,1-b]furan-2(1H)-one) is a norlabdane type terpenoid which originates in nature (Kaneko, H., Agr. Biol. Chem., 35 (9): 1461 (1971)). In the present invention, either sclareolide collected from nature or sclareolide that has been artificially synthesized may be used. Furthermore, there are no particular restrictions on the source from which 2-acetylpyrrole, which is a nitrogen-containing compound, is acquired. Both of these compounds are universally known, and can be obtained commercially.

It is desirable that the taste-improving composition of the present invention contain 2-acetylpyrrole at the rate of 0.001 to 1000 parts by weight, preferably 0.01 to 100 parts by weight, and even more preferably 0.1 to 50 parts by weight, per 1 part by weight of sclareolide.

The taste-improving composition of the present invention can be effectively used to improve the taste of orally ingested edible compositions that have a disagreeable taste such as a bitter taste, astringent taste, aftertaste or the like. Such compositions include food products, drugs or quasi-drugs that are administered orally or used in the oral cavity, which contain sweeteners, vitamins, amino acids, bitter-tasting agents, acidulants or the like. In particular, the taste-improving composition of the present invention shows a superior effect in improving the taste of sweeteners or compositions containing sweeteners.

In the present invention, the term "sweetener" refers broadly to additives that are used for the purpose of imparting sweetness to edible products such as food products, drugs or quasi-drugs that are orally administered or used in the oral cavity, and the like. The present invention may be used with either natural sweeteners or synthetic sweeteners, and with either low-intensity sweetener or high-intensity sweeteners. In concrete terms, sweeteners such as sucrose, lactose, maltose, glucose, fructose, invert sugar, trehalose, trehalulose, isotrehalose, neotrehalose, palatinose, galactose, D-xylose, fructose, rhamnose, beet oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, genetiotetraose and the like), glycerol, cyclodextrin, N-acetylglucosamine, arabinose, sorbose, teande-oligosaccharides, nigero-oligosaccharides, palatinose oligosaccharides, fucose, fructo-oligosaccharides (kestose, nistose and the like), polydextrose, maltotetraitol, maltotriitol, malto-oligosaccharides (maltotriose, maltotetraose, maltopentaose, maltohexaose, maltoheptaose and the like), lactulose, melibiose, raffinose, rhamnose, ribose, isomerized liquid sugars (high fructose corn syrup), coupling sugars, soybean oligosaccharides, invert sugar, glucose syrup, honey and the like; sugar alcohols such as xylitol, sorbitol, maltitol, isomaltitol, erythritol, mannitol, lactitol, reduced palatinose, reduced isomalto-oligosaccharides, reduced xylo-oligosaccharides, reduced gentio-oligosaccharides, reduced maltose syrup, reduced glucose syrup and the like; amino acids such as glycocol (glycine), D-tryptophan, sodium salt of L-leucine and the like; and high-intensity sweeteners such as sucralose, potassium acesulfame, thaumatin, aspartame, alitame, stevia extract, steviosides contained in stevia extract, saccharin, sodium saccharin, cyclamate (sodium cyclamate), licorice extract (glycyrrhizin), glycyrrhizinates, perillartine, cyclamine, dulcin, neotame, nigeria berry extract, luohanguo extract and the like.

The taste-improving composition of the present invention can impart a sharp and clean sensation to taste of saccharides such as sucrose, oligosaccharides and the like, or high-intensity sweeteners such as aspartame, potassium acesulfame and the like. Furthermore, the taste-improving composition of the present invention has a superior effect in improving the taste of sweeteners that have a disagreeable taste, e.g., an astringent taste, bitter taste, an aftertaste such as lingering taste or the like, by reducing or suppressing such disagreeable tastes.

Among sweeteners, the taste-improving composition of the present invention especially shows the abovementioned effect in the case of high-intensity sweeteners. The taste-improving composition of the present invention has an especially superior effect in reducing the disagreeable tastes of high-intensity sweeteners such as aspartame, potassium acesulfame, alitame, sucralose, stevia extract, thaumatin, saccharin, sodium saccharin, neotame, licorice extract and the like, and can be appropriately used in order to improve the taste of such high-intensity sweeteners. Preferable sweeteners in this case are aspartame, potassium acesulfame, licorice extract, saccharin, sodium saccharin, sucralose, stevia extract and neotame.

Furthermore, the sweeteners that are the object of the taste-improving composition of the present invention may consist of single sweetener, or may consist of arbitrary combinations of two or more sweeteners. There are no particular restrictions on such combinations; examples of combinations of high-intensity sweeteners include combinations of two sweeteners such as aspartame and potassium acesulfame, potassium acesulfame and stevia extract, aspartame and sucralose, potassium acesulfame and sucralose or the like, and combinations of three sweeteners such as aspartame, potassium acesulfame and sucralose, potassium acesulfame, sucralose and stevia extract or the like. Furthermore, combinations of at least one of the abovementioned high-intensity sweeteners with at least one sugar alcohol such as erythritol or the like, and combinations of at least one of the abovementioned high-intensity sweeteners with at least one saccharide such as sucrose, fructose, high fructose corn syrup or the like, may also be cited as examples.

In addition to the abovementioned components, the taste-improving composition of the present invention may also contain food additives, or additives of drugs or quasi-drugs that are orally administered or used in the oral cavity, e.g., flavors; colorants; antioxidants; preservatives; vitamins; minerals such as calcium (e.g., calcium lactate, calcium gluconate or the like), iron, magnesium, phosphorus, potassium, sodium and the like, unless the effect of the present invention is not hindered.

Furthermore, the taste-improving composition of the present invention may be used in any type of formulation, and may have a powder form, granular, solid (tablets, pills or the like) or liquid formulation.

The taste-improving composition of the present invention may be added and mixed "as is" with sweeteners for the purpose of improving the taste of sweeteners or preparing sweeteners with a favorable taste, or may be used as one of the raw material components of sweeteners when the sweeteners (blended sweeteners) are manufactured. The mixture proportions vary according to the type of intended sweetener, and cannot be definitively fixed. However, in cases where saccharides (e.g., sucrose or oligosaccharides) or sugar alcohols are used as the sweetener, the taste-improving composition can be used in proportions which are such that sclareolide is contained at the rate of 0.001 to 2000 wt %, preferably 0.005 to 500 wt %, and even more preferably 0.01 to 200 wt %, per 100 wt % of the final sweetener (blended sweetener). Furthermore, in cases where a high-intensity sweetener is used as the sweetener, the taste-improving composition can be used in proportions which are such that sclareolide is contained at the rate of 0.0001 to 200 wt %, preferably 0.0005 to 50 wt %, and even more preferably 0.001 to 20 wt %, per 100 wt % of the final sweetener (blended sweetener). Furthermore, the proportion of 2-acetylpyrrole contained in the final sweetener (blended sweetener) is 0.001 to 1000 parts by weight, preferably 0.01 to 100 parts by weight, and even more preferably 0.1 to 50 parts by weight, per 1 part by weight of the sclareolide contained in this sweetener.

Furthermore, the taste-improving composition of the present invention can also be added and mixed with edible products that contain sweeteners for the purpose of improving the taste of such edible products, or for the purpose of preparing edible products containing sweeteners that have a favorable taste. Moreover, the taste-improving composition of the present invention can be used as one component together with the raw material components of edible products when such edible products are manufactured for the abovementiond purposes. Furthermore, the mixture proportions used in such cases can be similarly adjusted and determined using the abovementioned proportions as a reference.

(2) Taste-Improving Method for Edible Products

The present invention provides a method for improving the taste of edible products that contain sweeteners (sweetener-containing edible products).

The method of the present invention for improving the taste of edible products that contain sweeteners can be worked by using a sweetener, sclareolide and 2-acetylpyrrole in combination as components of the edible product. There are no particular restrictions on the concrete method that is used to combine these components; for example, a method in which sclareolide and 2-acetylpyrrole are added and mixed with an edible product that contains a sweetener, or a method in which an edible product is prepared by adding sclareolide and 2-acetylpyrrole as well as the sweetener and other raw material components at the time of manufacture of the edible product, may be cited as examples. Furthermore, the sclareolide and 2-acetylpyrrole that are used in combination with a sweetener here may be used separately, or may be used in the abovementioned aspects of the taste-improving composition of the present invention.

Sweeteners that can be used in the sweetener-containing edible products that are the object of the present invention include broadly additives that are used for the purpose of imparting sweetness to edible products as describe in (1) above. Concrete examples are the same as those described in (1) above. Preferably, these sweeteners are high-intensity sweeteners that have a disagreeable taste, e.g., an astringent taste, a bitter taste or an aftertaste such as a lingering taste. Concrete examples include aspartame, potassium acesulfame, alitame, licorice extract, sucralose, stevia extract, thaumatin, saccharin, sodium saccharin and neotame. Preferably sweeteners are aspartame, potassium acesulfame, licorice extract, saccharin, sodium saccharin, sucralose, stevia extract and neotame.

There are no particular restrictions on the edible products that are the object of the present invention, as long as these edible products contain one or more sweeteners. For example, products that are orally ingested and products that are utilized in the oral cavity may be cited as examples. Concrete examples include food products; drugs that are orally administered or used in the oral cavity such as sugar-coated tablets, troche agents, drop agents, syrup agents and the like; and quasi-drugs or other paraphernalia used in the oral cavity such as mouth freshening agents, gargling agents, toothpaste and the like.

Here, there are no particular restrictions on food products that can be used. Such products include general beverages, e.g., fruit juices originating in fruits or vegetables, fruit juices including squeezed juices or the like, fruit juices containing fruit particles, fruit beverages, fruit juice beverages, beverages containing fruit juices, vegetable juices, juices containing vegetables, and mixed juices containing fruits and vegetables; carbonated beverages such as colas, ginger ales, ciders and the like; soft beverages such as sport drinks, near water and the like; tea type or favorite type beverages such as coffee, cocoa, black tea, maccha (powdered green tea), green tea, oolong tea and the like; beverages containing milk components such as milk beverages, coffee containing milk components, café au lait, milk tea, maccha milk (milk containing powdered green tea), fruit milk beverages, drinkable yogurt, lactic acid bacteria beverages or the like; desserts such as yogurt, jellies, drinkable jellies, puddings, Bavarian cream, blancmange, mousse and the like (sweetened food products eaten at tea time or following meals); cold confections, e.g., types of ice cream such as ice cream, ice milk, lacto-ice and the like (food products in which sweeteners and various other types of raw materials are added to milk products, and the resulting mixture is agitated and frozen), and ice confections such as sherbets, dessert ices and the like (food products in which various other types of raw materials are added to a sugary liquid, and the resulting mixture is agitated and frozen); general confections, e.g., baked confections or steamed confections including western confections and Japanese confections such as cakes, crackers, biscuits, buns with bean-jam filling and the like; rice cakes and snacks; general sugar confections such as chewing gum, hard candy, nougat candy, jelly beans and the like; sweeteners including cooking sweeteners, table sweeteners and the like; sauces including fruit flavored sauces, chocolate sauces and the like; cremes including butter cremes, flour pastes, whipped cream and the like; jams including strawberry jam, marmalade and the like; breads including sweet breads and the like; general condiments including seasoned soy sauce used on roasted meats, roast fowl, barbecued eel and the like, as well as tomato catsup, sauces, noodle broth and the like; processed agricultural products, livestock products or seafood, e.g., fish cake such kamaboko (a boiled fish paste) and the like; processed meat products such as sausage and the like; retort food products, pickles, preserves boiled in soy sauce, delicacies, side dishes, frozen foods and the like. The food product of the present invention is preferably beverages, table sweeteners, desserts and cold confections, and is most preferably a beverage. In particular, the method of the present invention makes it possible to favorably improve the taste of beverages containing high-intensity sweeteners by significantly reducing disagreeable tastes, e.g., an astringent taste, bitter taste or aftertastes such as lingering taste, caused by such high-intensity sweeteners.

In the present invention, the proportions of sclareolide and 2-acetylpyrrole that are mixed with the edible product may be appropriately adjusted in accordance with the strength and nature of the sweetness that is required in the final product; there are no particular restrictions on these proportions. Ordinarily, these proportions may be appropriately adjusted within the abovementioned range of mixture proportions of the taste-improving composition.

In concrete terms, the proportion of sclareolide that is mixed with 100 wt % of the sweetener-containing edible product (final product) is 0.000005 to 0.5 wt %, preferably 0.000025 to 0.25 wt %, and even more preferably 0.0001 to 0.1 wt %.

Furthermore, in regard to the proportion of 2-acetylpyrrole contained in the sweetener-containing edible product (final product), 2-acetylpyrrole is added at the rate of 0.001 to 1000 parts by weight, preferably 0.01 to 100 parts by weight, and even more preferably 0.1 to 50 parts by weight, per 1 part by weight of sclareolide contained in the sweetener-containing edible product.

Furthermore, the proportions of sweetener, sclareolide and 2-acetylpyrrole contained in the edible product may be appropriately adjusted in accordance with the type and amount of sweetener used, the type of edible product involved, and the nature and degree of the sweetness that is required in this edible product. To provide some examples, in the case of an edible product containing sucralose as a sweetener at the rate of 0.0005 to 0.26 wt % (5 to 2600 ppm), the proportions of sclareolide and 2-acetylpyrrole that are added may be 0.0000001 to 0.1 wt % (0.001 to 1000 ppm) and 0.0000025 to 0.25 wt % (0.025 to 2500 ppm), respectively. Especially in the case of beverages containing sucralose as a sweetener at the rate of 0.0005 to 0.05 wt % (5 to 500 ppm), the proportions of sclareolide and 2-acetylpyrrole that are added may be 0.0000001 to 0.02 wt % (0.001 to 200 ppm) and 0.0000025 to 0.025 wt % (0.025 to 250 ppm), respectively. Of course, the optimal proportions vary according to the degree of sweetness and nature of the sweetness that are required, and according to the type of edible product, and temperature at which the product is ingested and the like. Accordingly, as long as the effect of the present invention is manifested, these proportions may be appropriately adjusted by a person skilled in the art, and are not necessarily limited to the abovementioned concentration ranges.

As long as the edible products obtained by the taste-improving method of the present invention contain a sweetener, sclareolide and 2-acetylpyrrole, there are no particular restrictions on the time or order of addition of the respective components of the edible products. Furthermore, if necessary, the edible product may contain additives that are permissible in the fields of food products, drugs and quasi-drugs, such as flavors, colorants, antioxidants, preservatives, vitamins, and minerals such as calcium (e.g., calcium lactate, calcium gluconate or the like), iron, magnesium, phosphorus, potassium, sodium and the like.

When the taste-improving method of the present invention is used for edible products containing saccharides (e.g., sucrose or oligosaccharides) or sugar alcohols, a taste with a sharp and clean sensation can be provided to the edible products, in addition to the full-bodied sensation arising from the saccharides or the sugar alcohols. Furthermore, when the taste-improving method of the present invention is used, disagreeable tastes such as the astringent taste, bitter taste or aftertaste arising from high-intensity sweeteners or other sweeteners can be reduced, or the appearance of such disagreeable tastes can be suppressed, so that good-tasting edible products that have an improved taste can be provided.

(3) Edible Products

The present invention provides an edible product containing a sweetener (sweetener-containing edible product) whose taste is improved. The edible product of the present invention is characterized in that this edible product contains a sweetener, sclareolide and 2-acetylpyrrole.

Here, the term "sweetener" refers broadly to additive that are used for the purpose of imparting sweetness to edible products as described above in (1). The sweeteners used are preferably high-intensity sweeteners that have a disagreeable taste, e.g., an astringent taste, bitter taste or an aftertaste such as lingering taste. Concrete examples of such sweeteners include aspartame, potassium acesulfame, alitame, licorice extract, sucralose, stevia extract, thaumatin, saccharin, sodium saccharin and neotame. Especially desirable sweeteners are aspartame, potassium acesulfame, licorice extract, saccharin, sodium saccharin, sucralose, stevia extract and neotame.

There are no particular restrictions on the edible products that are the object of the present invention, as long as these edible products contain one or more sweeteners. For example, products that are orally ingested and products that are utilized in the oral cavity may be cited as examples. Concrete examples include food products; drugs that are orally administered or used in the oral cavity such as sugar-coated tablets, troche agents, drop agents, syrup agents and the like; and quasi-drugs or other paraphernalia used in the oral cavity such as mouth freshening agents, gargling agents, toothpaste and the like. Concrete examples of food products are the same as those cited in (2) above. These food products are preferably beverages, table sweeteners, desserts or cold confections, and beverages are especially desirable. In cases where the edible product of the present invention is a product that contains a saccharide such as sucrose or an oligosaccharide, or a sugar alcohol, as a sweetener, this product has a taste with a sharp and clean sensation. Furthermore, in cases where the edible product is a product that contains a high-intensity sweetener as a sweetener, disagreeable tastes, e.g., an astringent taste, bitter taste or aftertastes such as lingering taste, that are caused by the high-intensity sweetener are significantly reduced, so that a favorable taste is obtained.

The proportions of sclareolide and 2-acetylpyrrole contained in the sweetener-containing edible product of the present invention may be appropriately adjusted in accordance with the strength and nature of the sweetness that is required in the final product; there are no particular restrictions on these proportions.

In concrete terms, sclareolide may be contained in the product at the rate of 0.000005 to 0.5 wt %, preferably 0.000025 to 0.25 wt %, and more preferably 0.0001 to 0.1 wt %. per 100 wt % of the sweetener-containing edible product (final product).

Furthermore, the proportion of 2-acetylpyrrole that is contained in the sweetener-containing edible product (final product) may be set so that the amount of 2-acetylpyrrole contained is 0.001 to 1000 parts by weight, preferably 0.01 to 100 parts by weight, and more preferably 0.1 to 50 parts by weight, per 1 part by weight of the sclareolide contained in the sweetener-containing edible product.

Furthermore, the proportions of sweetener, sclareolide and 2-acetylpyrrole contained in the edible product may be appropriately adjusted in accordance with the type and amount of sweetener used, the type of edible product, and the nature and degree of the sweetness that is required in this edible product. To provide one example, in the case of an edible product containing sucralose as a sweetener at the rate of 0.0005 to 0.26 wt % (5 to 2600 ppm), the proportions of sclareolide and 2-acetylpyrrole that are added in the edible product may be 0.0000001 to 0.1 wt % (0.001 to 1000 ppm) and 0.0000025 to 0.25 wt % (0.025 to 2500 ppm), respectively. Especially in the case of beverages containing sucralose as a sweetener at the rate of 0.0005 to 0.05 wt % (5 to 500 ppm), the proportions of sclareolide and 2-acetylpyrrole that are added in the beverages may be 0.0000001 to 0.02 wt % (0.001 to 200 ppm) and 0.0000025 to 0.025 wt % (0.025 to 250 ppm), respectively. Of course, the optimal proportions vary according to the degree of sweetness and taste of the sweetness that are required, and according to the type of edible product, temperature at which the product is ingested and the like. Accordingly, as long as the effect of the present invention is manifested, these proportions may be appropriately adjusted by a person skilled in the art, and are not necessarily limited to the abovementioned concentration ranges.

It is sufficient if the edible product of the present invention contains a sweetener, sclareolide and 2-acetylpyrrole; if necessary, the edible product may also contain additives that are permissible in the fields of food products, drugs and quasi-drugs, such as flavors, colorants, antioxidants, preservatives, vitamins, and minerals such as calcium (e.g., calcium lactate, calcium gluconate or the like), iron, magnesium, phosphorus, potassium, sodium and the like.

For example, in cases where the sweetener-containing edible product of the present invention contains a saccharide such as sucrose or an oligosaccharide, or a sugar alcohol, as a sweetener, the edible product has a taste with a sharp and clean sensation in addition to the feeling of body provided by the above-mentioned saccharide. Furthermore, in cases where the product contains a high-intensity sweetener as a sweetener, disagreeable tastes such as an astringent taste, bitter taste or aftertaste caused by the high-intensity sweetener are reduced or masked, so that an improved taste is obtained.

EXAMPLES

The contents of the present invention will be concretely described below using the following experimental examples and examples. However, the present invention is not limited to these examples. Furthermore, unless otherwise noted, all "parts" are "parts by weight" and all "%" are "weight %". Moreover, an asterisk indicates a product manufactured by San-Ei Gen F.F.I. Inc.

Experimental Example 1

Each of 0.014% sucralose solutions containing sclareolide and 2-acetylpyrrole (Example 1, Comparative Example 1-A and Comparative Example 1-B) was prepared as shown in Table 1 below, and the taste following ingestion of the respective solutions (bitter taste, astringent taste or aftertaste such as lingering taste) was evaluated. Evaluation was performed by a sensory test using 25 panel members. In concrete terms, the respective solutions were ingested by the panel members with the panel members unaware of the formulations of the solutions, and the panel members were asked to select solutions that had a good taste (no bitter taste, no astringent taste, and a weak lingering taste) following ingestion. The results obtained are also shown in Table 1. Furthermore, significant differences were judged from a verification table for a two-point comparison method (two-sided verification) (Sensory Test Handbook, edited by the Sensory Test Committee of the Scientific and Technical Union, JUSE (Union of Japanese Scientists and Engineers), 13th Printing, Mar. 7, 1995).

Significant difference: 20 panel members or more at a significance level of 1%, 21 panel members or more at a significance level of 0.1%.

TABLE 1

|  | Sclareolide (%) | 2-Acetylpyrrole % | Number of persons that evaluated taste as favorable following ingestion |
|---|---|---|---|
| Example 1 | 0.00001 | 0.00025 | 21 (persons) |
| Comparative Example 1-A | 0.00001 | — | 12 (persons) |
| Comparative Example 1-B | — | 0.00025 | 16 (persons) |

It is seen from Table 1 that the combined use of sclareolide and 2-acetylpyrrole with sucralose results in a reduction in the astringent taste, bitter taste and lingering taste caused by sucralose (a high-intensity sweetener), and an improvement in the taste of sucralose, compared to cases where each of sclareolide or 2-acetylpyrrole are used with sucralose.

Experimental Examples 2 to 6

Preparation of Taste-Improving Compositions

Taste-improving composition 1 was prepared according to the formulation shown below.

| <Formulation of Taste-Improving Composition 1> | |
|---|---|
| Sclareolide | 0.01 (parts) |
| 2-Acetylpyrrole | 0.25 |
| Propylene glycol | 50.00 |
| Water | Balance |
| Total | 100.00 parts |

As comparative examples, taste-improving compositions 2 and 3 with the following formulation were also prepared.

| <Formulation of Taste-Improving Composition 2> | |
|---|---|
| Sclareolide | 0.01 (parts) |
| Propylene glycol | 50.00 |
| Water | Balance |
| Total | 100.00 parts |

| <Formulation of Taste-Improving Composition 3> | |
|---|---|
| 2-Acetylpyrrole | 0.25 (parts) |
| Propylene glycol | 50.00 |
| Water | Balance |
| Total | 100.00 parts |

Using the above-mentioned taste-improving composition 1, sports beverages were prepared according to the formulation shown below. In concrete terms, the raw materials other than the flavor were agitated and dissolved in water. After this solution was heated to 93° C., the flavor was added, and containers were filled with the product and cooled, thus preparing sports beverages (Examples 2 to 6: beverages of the present invention). A high-intensity sweetener used in the following formulation is shown in Table 2.

| <Beverage Formulation> | |
|---|---|
| Above-mentioned taste-improving composition 1 | 0.1 parts |
| High-intensity sweetener | as in Table 2 |
| Citric acid (anhydrous) (Citric acid (anhydrous) N*) | 0.15 |
| Trisodium citrate (Trisodium citrate F*) | 0.03 |
| Sodium chloride | 0.05 |
| Potassium chloride | 0.03 |
| Calcium lactate | 0.03 |
| L-ascorbic acid | 0.05 |
| L-threonine | 0.001 |
| L-phenylalanine | 0.001 |
| Flavor (Sweety Essence No. 66781*) | 0.1 |
| Water | Balance |
| Total | 100.00 parts |

As comparative examples, comparative sports beverages (Comparative Examples 2-A to 6-A and Comparative Examples 2-B to 6-B: comparative beverages) were prepared in the same manner as in Examples 2 to 6 using taste-improving composition 2 (containing sclareolide) and taste-improving composition 3 (containing 2-acetylpyrrole) instead of the above-mentioned taste-improving composition 1 (containing sclareolide and 2-acetylpyrrole). Furthermore, control sports beverages (Control Examples 2 to 6: control beverages) were prepared in the same manner as in Examples 2 to 6. The taste of the beverages of the present invention and the comparative beverages was comparatively evaluated for each high-intensity sweetener used using the reference sports beverages as a control.

In concrete terms, the evaluation was performed by asking 25 panel members to drink and compare each of the beverages of the present invention containing the abovementioned taste-improving composition (Examples 2 to 6: beverages of the present invention) or the comparative beverages (Comparative Examples 2-A to 6-A, Comparative Examples 2-B to 6-B) and the corresponding control beverages (Control Examples 2 to 6: control beverages) containing no taste-improving composition, and an evaluation was made as to whether or not the taste of the beverages of the present invention or the comparative beverages was improved relative to the control beverages. Furthermore, the panel members were asked to grade the aftertaste (astringent taste, bitter taste or lingering taste) of the sweetness of each beverage in terms of numerical values on the basis of the following evaluation points, and the average of the evaluation points for each of the panel members was calculated. The results are also shown in Table 2.

<Evaluation Points>
−2: strong aftertaste
−1: somewhat strong aftertaste
0: no difference
1: aftertaste somewhat weakened
2: aftertaste weakened

TABLE 2

| | High-intensity sweetener used | Amount of high-intensity sweetener added (%) | No. of taste-improving composition used | Average of evaluation points | Number of persons that evaluated taste of beverage of the present invention or comparative beverage was favorable compared to respective control beverages (Control Examples 2 to 6) |
|---|---|---|---|---|---|
| Ex. 2 | Aspartame | 0.0268 | 1 | 1.54 | 20 (persons) |
| Com. Ex. 2-A | Aspartame | 0.0268 | 2 | 1.13 | 14 (persons) |
| Com. Ex. 2-B | Aspartame | 0.0268 | 3 | 0.88 | 12 (persons) |
| Ex. 3 | Potassium acesulfame | 0.0357 | 1 | 1.00 | 18 (persons) |
| Com. Ex. 3-A | Potassium acesulfame | 0.0357 | 2 | 0.71 | 13 (persons) |
| Com. Ex. 3-B | Potassium acesulfame | 0.0357 | 3 | 0.78 | 13 (persons) |
| Ex. 4 | Sucralose | 0.01 | 1 | 1.88 | 21 (persons) |
| Com. Ex. 4-A | Sucralose | 0.01 | 2 | 1.06 | 11 (persons) |
| Com. Ex. 4-B | Sucralose | 0.01 | 3 | 1.18 | 15 (persons) |
| Ex. 5 | Stevia Extract | 0.0214 | 1 | 1.00 | 18 (persons) |
| Com. Ex. 5-A | Stevia Extract | 0.0214 | 2 | 0.87 | 10 (persons) |
| Com. Ex. 5-B | Stevia Extract | 0.0214 | 3 | 0.69 | 8 (persons) |
| Ex. 6 | Neotame | 0.00061 | 1 | 1.08 | 21 (persons) |
| Com. Ex. 6-A | Neotame | 0.00061 | 2 | 0.75 | 12 (persons) |
| Com. Ex. 6-B | Neotame | 0.00061 | 3 | 0.74 | 11 (persons) |

(Note)
"Ex." means Example, and
"Com. Ex." means Comparative Example.

It is seen from Table 2 that the beverages of the present invention prepared using taste-improving composition 1 (containing sclareolide and 2-acetylpyrrole) showed little astringent taste, bitter taste or lingering taste following ingestion, and thus showed an improved taste, regardless of which kind of sweetener (aspartame, potassium acesulfame, sucralose, stevia extract or neotame) was used.

Furthermore, the comparative beverages that were prepared using taste-improving composition 2 (containing sclareolide) or taste-improving composition 3 (containing 2-acetylpyrrole) showed a significant astringent taste, bitter taste or lingering aftertaste, compared to the beverages of the present invention prepared using taste-improving composition 1 containing sclareolide and 2-acetylpyrrole.

Example 7

Coffee Beverage

Among the ingredients shown in the following composition, a powdered mixture of the sugar and emulsifier was added to water, and this mixture was heated and dissolved for 10 minutes at 80° C. Afterward, the milk and non-fat powdered milk were added, and the coffee extract liquid was added thereto. This mixture was adjusted to a pH of 6.8 using sodium hydrogencarbonate; then, the remaining raw materials were added, and the mixture was filled out to the entire amount by adding water. This mixture was heated to 75° C., and was subjected to a homogenizing treatment at a pressure of 14700 kPa (150 kg/cm$^2$), thus producing a coffee beverage solution. The finished solution was canned, and was then subjected to a sterilization treatment for 20 minutes at 121° C. using a retort sterilizing apparatus, thus producing a coffee beverage (4 g/100 ml calculated in terms of raw beans).

| <Formulation> | |
|---|---|
| Coffee extract liquid (Bx3.0: Blended bean L value = 23) | 28.0 parts |
| Milk | 10.0 |
| Non-fat powdered milk | 0.5 |
| High-intensity sweetener (SANSWEET [trademark] SA-5050*) | 0.017 |
| Sugar | 1.4 |
| Edible fiber (Lightess: manufactured by Danisco Japan K.K.) | 1.0 |
| Emulsifier (HOMOGEN No. 1379*) | 0.14 |
| Sodium hydrogencarbonate | adjusted to pH 6.8 |
| Flavor (Coffee flavor No. 70306*) | 0.08 |
| Taste-improving composition 1 used in Experimental Example 2 (product of the present invention) | 0.05 |
| Water | Balance |
| Total | 100.00 parts |

The coffee beverage thus obtained showed no bitter taste, astringent taste or lingering taste, and had a good taste.

Example 8

Portion Gum Syrup

Among the ingredients shown in the following composition, the thickener was dispersed in the high fructose corn syrup; water was then added and this mixture was agitated and dissolved. Next, the potassium acesulfame, sucralose and stevia extract were added, and this mixture was heated and dissolved for 10 minutes at 80° C. Afterward, the remaining raw materials were added, and the entire amount was filled out with water. A portion cup was filled with this mixture, thus producing a portion gum syrup. The syrup thus obtained showed no disagreeable aftertaste originating in the high-intensity sweeteners. Furthermore, the beverage prepared by adding this syrup as a sweetener to iced coffee had a clean favorable drinking taste.

| <Formulation> | |
| --- | --- |
| High fructose corn syrup (Brix75°) | 45.5 |
| Potassium acesulfame | 0.05 |
| Sucralose* | 0.03 |
| Stevia extract | 0.02 |
| Thickener (VIS-TOP [trademark] D-3000-C*) | 0.1 |
| Sclareolide | 0.00001 |
| 2-Acetylpyrrole | 0.0001 |
| Preservative (Strong SANPRESER [trademark] N-13*) | 0.1 |
| Water | Balance |
| Total | 100.00 parts |

Example 9

Low-Calorie Drinkable Jelly

Among the ingredients in the following composition, the gelling agent, high fructose corn syrup, aspartame, potassium acesulfame and sucralose were added to water, and this mixture was heated and dissolved for 10 minutes at 80° C. Afterward, the remaining raw materials were added, and the full amount was filled out with water. Containers were filled with this preparation, and a sterilization treatment was performed for 30 minutes at 85° C., thus producing an ordinary-temperature low-calorie drinkable jelly (pH 3.8, calories: 18 kcal/100 g). The drinkable jelly thus obtained showed no disagreeable taste such as a lingering taste originating in the high-intensity sweeteners, and had a clean and favorable taste.

| <Formulation> | |
| --- | --- |
| Clear apple juice condensed 5 times | 4.40 parts |
| Gelling agent (GELUP [trademark] K-S*) | 0.25 |
| High fructose corn syrup | 2.00 |
| Aspartame | 0.01 |
| Potassium acesulfame | 0.01 |
| Sucralose* | 0.005 |
| Citric acid (anhydrous) N* | 0.15 |
| Trisodium citrate F* | 0.05 |
| Sclareolide | 0.000012 |
| 2-Acetylpyrrole | 0.00005 |
| Flavor (Apple flavor No. 64625*) | 0.20 |
| Flavor (SAN-AROMA FAM [trademark] No. 9603 (N))* | 0.02 |
| Water | Balance |
| Total | 100.00 parts |

Example 10

Dessert Ice (Grapefruit: Ice Confection)

Sucralose, edible fiber and a stabilizer were added to containers containing water, and this mixture was heated, agitated and dissolved for 10 minutes at 80° C. Afterward, fruit juice and citric acid were added to fill out the entire amount, and this mixture was cooled to approximately 50° C. under agitation. Next, the calcium lactate and other raw materials that had been dissolved beforehand in hot water were added, and the resulting mixture was further cooled to 5° C. under agitation. Ice tubes were filled with this mixture, and the mixture was solidified. Following solidification, the mixture was removed from the ice tubes, supercooled and crushed, thus producing a dessert ice. The dessert ice thus obtained had a clean aftertaste, and showed a favorable flavor.

| <Formulation> | |
| --- | --- |
| Sucralose* | 0.019 parts |
| Clear grapefruit juice concentrated 7 times | 0.43 |
| Edible fiber (Fibersol 2H: manufactured by Matsutani Chemical Industry Co., Ltd.) | 0.2 |
| Calcium lactate | 0.1 |
| Citric acid (anhydrous) (citric acid (anhydrous) N*) | 0.2 |
| Stabilizer (SANNICE [trademark] R YK-151*) | 0.35 |
| Sclareolide | 0.00003 |
| 2-Acetylpyrrole | 0.00001 |
| Flavor (Grapefruit Essence No. 72416*) | 0.2 |
| Water | Balance |
| Total | 100.00 parts |

INDUSTRIAL APPLICABILITY

The taste-improving composition of the present invention makes it possible to impart a tasted with a sharp and clean sensation to sweeteners, and to eliminate disagreeable tastes, e.g., astringent taste, bitter taste or aftertastes such as an lingering taste, typically found in high-intensity sweeteners, so that the taste of such sweeteners can be significantly improved. Moreover, by using sclareolide and 2-acetylpyrrole in combination in edible products that contain high-intensity sweeteners, it is possible to eliminate disagreeable tastes, e.g., an astringent taste, bitter taste or aftertastes such as lingering taste, originating in the high-intensity sweeteners, so that the taste of such of the edible products can be significantly improved.

The invention claimed is:

1. A taste-improving composition for a high-intensity sweetener which is at least one selected from potassium acesulfame, sucralose, and neotame which contains sclareolide and 2-acetylpyrrole, wherein the 2-acetylpyrrole and sclareolide are in a proportion of 0.1 to 50 parts by weight of 2-acetylpyrrole to 1 part by weight of sclareolide, and wherein said sclareolide is 0.001 to 20 weight percent of the combined weight of the sclareolide, 2-acetylpyrrole and sweetener.

2. The taste-improving composition according to claim 1, wherein the high-intensity sweetener is sucralose.

3. A method for improving a taste of edible products containing a high-intensity sweetener which is at least one selected from potassium acesulfame, sucralose, and neotame comprising utilizing sclareolide and 2-acetylpyrrole in combination with said sweetener, wherein the 2-acetylpyrrole and sclareolide are in a proportion of 0.1 to 50 parts by weight of 2-acetylpyrrole to 1 part by weight of sclareolide, and wherein said sclareolide is 0.001 to 20 weight percent of the combined weight of the sclareolide, 2-acetylpyrrole and sweetener.

4. The method for improving a taste of edible products according to claim 3, wherein the high-intensity sweetener is sucralose.

5. The method for improving a taste of edible products according to claim 3, wherein the edible product is selected from table sweeteners, beverages, desserts and cold confections.

6. An edible product containing sclareolide, 2-acetylpyrrole and a sweetener, wherein the sweetener is a high-intensity sweetener which is at least one selected from potassium acesulfame, sucralose, and neotame, wherein the sclareolide and 2-acetylpyrrole are in a proportion of 0.1 to 50 parts by weight of 2-acetylpyrrole to 1 part by weight of sclareolide, wherein said sclareolide is 0.001 to 20 weight percent of the combined weight of the sclareolide, 2-acetylpyrrole and sweetener and wherein the taste of said sweetener has been improved.

7. The edible product according to claim 6, wherein the high-intensity sweetener is sucralose.

8. The edible product according to claim 6, wherein the edible product is selected from table sweeteners, beverages, desserts and cold confections.

9. The edible product according to claim 8, wherein the high-intensity sweetener is sucralose.

10. The method for improving a taste of edible products according to claim 5, wherein the high-intensity sweetener is sucralose.

11. The taste-improving composition according to claim 1, wherein said sclareolide is 0.005 to 20 weight percent of the combined weight of the sclareolide, 2-acetylpyrrole and sweetener.

12. The method for improving a taste of edible products according to claim 3, wherein said sclareolide is 0.005 to 20 weight percent of the combined weight of the sclareolide, 2-acetylpyrrole and sweetener.

13. The edible product according to claim 6, wherein said sclareolide is 0.005 to 20 weight percent of the combined weight of the sclareolide 2-acetylpyrrole and sweetener, and wherein the amount of sclareolide is 0.0001 to 0.1 wt. % based on the weight of the edible product.

* * * * *